(12) United States Patent
Kusens (10) Patent No.: US 11,792,608 B2
(45) Date of Patent: *Oct. 17, 2023

(54) ELECTRONIC LOCATION DETERMINATION AND TRACKING SYSTEM WITH VIRTUAL BEACON CLUSTERING

(71) Applicant: COLLATERAL OPPORTUNITIES OF NEVADA, LLC, College Grove, TN (US)

(72) Inventor: Michael Kusens, Southwest Ranches, FL (US)

(73) Assignee: COLLATERAL OPPORTUNITIES OF NEVADA, LLC, College Grove, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,167

(22) Filed: Aug. 12, 2022

(65) Prior Publication Data

US 2023/0041217 A1 Feb. 9, 2023

Related U.S. Application Data

(63) Continuation of application No. 17/035,338, filed on Sep. 28, 2020, now Pat. No. 11,418,921, which is a continuation of application No. 16/590,997, filed on Oct. 2, 2019, now Pat. No. 10,791,428, which is a continuation of application No. 16/260,236, filed on
(Continued)

(51) Int. Cl.
| | |
|---|---|
| H04W 4/029 | (2018.01) |
| H04B 17/318 | (2015.01) |
| G01S 1/08 | (2006.01) |
| G06F 16/23 | (2019.01) |
| G06F 16/29 | (2019.01) |
| G01S 5/02 | (2010.01) |

(52) U.S. Cl.
CPC ............ *H04W 4/029* (2018.02); *G01S 1/08* (2013.01); *G01S 5/02521* (2020.05); *G06F 16/23* (2019.01); *G06F 16/29* (2019.01); *H04B 17/318* (2015.01); *G01S 2205/02* (2020.05); *G01S 2205/09* (2020.05)

(58) Field of Classification Search
CPC ........................ H04W 4/02; G01S 2205/02
USPC .................... 370/311, 338; 455/567, 406
See application file for complete search history.

(56) References Cited

U.S. PATENT DOCUMENTS

| | | | | |
|---|---|---|---|---|
| 6,175,734 B1 * | 1/2001 | Desgagne | ............ | H04W 16/18 455/67.11 |
| 2015/0278867 A1 * | 10/2015 | Lerman | ............... | H04W 40/244 705/14.58 |

* cited by examiner

*Primary Examiner* — Kiet M Doan
(74) *Attorney, Agent, or Firm* — Daniel S. Polley, P.A.

(57) ABSTRACT

A system and method for identifying a person's location at a school, hotel, office, business, restaurant or other venue and tracking the movements of that person during their visit to the venue. One or more wireless virtual beacons communicate with the person's electronic device. The virtual beacons provide the system with real-time data about the person's whereabouts, allowing for the confirmation and tracking of the person at the location. A first non-limiting example of use, include a company that provides food and beverage allowing the person to place an order for food and beverages on their electronic device and having the order delivered to the person at their current location as determined by the system. Another non-limiting example includes a company performing analytics on the time and movement of it's employees and customers.

16 Claims, 7 Drawing Sheets

Related U.S. Application Data

Jan. 29, 2019, now Pat. No. 10,440,519, which is a continuation of application No. 15/802,594, filed on Nov. 3, 2017, now Pat. No. 10,194,278, which is a continuation-in-part of application No. 15/230,415, filed on Aug. 6, 2016, now Pat. No. 9,838,849.

(60) Provisional application No. 62/202,357, filed on Aug. 7, 2015.

ELECTRONIC LOCATION DETERMINATION AND TRACKING SYSTEM WITH VIRTUAL BEACON CLUSTERING

This application is a continuation of U.S. application Ser. No. 17/035,338, filed Sep. 28, 2020, which is a continuation of U.S. application Ser. No. 16/590,997, filed Oct. 2, 2019, now U.S. Pat. No. 10,791,428, which is a continuation of U.S. application Ser. No. 16/260,236, filed Jan. 29, 2019, now U.S. Pat. No. 10,440,519, which is a continuation of U.S. application Ser. No. 15/802,594, filed Nov. 3, 2017, now U.S. Pat. No. 10,194,278, which is a continuation-in-part of U.S. application Ser. No. 15/230,415, filed Aug. 6, 2016, now U.S. Pat. No. 9,838,849, which claims the benefit of and priority to U.S. Provisional Patent Application Ser. No. 62/202,357, filed Aug. 7, 2015. All applications are incorporated by reference in their entireties for all purposes.

BACKGROUND

Numerous industries require accurate, real-time location determination and tracking of people, both persons and employees. A variety of technologies exist on the market to perform such location determination and location tracking but each with their own shortfalls. In general, location determination and tracking technologies can be separated into passive and active tracking types. Passive technologies such as passive-RFID and IR-based tags are inexpensive for the individual tags but require the physical installation and maintenance of numerous exciters, beacons or receiver hardware to function. Also, passive technologies are more suited to choke point locations where you can determine a data and time that a person passed a particular exciter or sensor but not continuously receive location data. Another issue with passive technologies is that they tend to require clear line-of-sight between the tag and the exciter/receiver thus requiring the tags to be constantly visible on the outside of a person's clothing.

Active tracking technologies such as WiFi, Active-RFID and Bluetooth Low Energy solve some of the problems with passive technologies by providing constant location information and the ability to work without line-of-sight. Active tags are more expensive than passive ones and require a battery for power, leading to a wide range of lifespans depending on the technology. Additionally, active technologies are prone to signal bleed and interference issues that will affect location determination and tracking accuracy.

This application is directed towards addressing or reducing these problems with existing active and passive location determination and tracking technologies.

SUMMARY OF THE DISCLOSURE

A method and system are described that allow companies (as defined below), to determine an employee or person's location using virtual beacon clusters and an electronic device including, but not limited to, Smartphones, iPhones, iPads, iWatches, Android-powered Phones, Android-powered Tablets, Smartwatches and like devices.

The disclosed method can be preferably performed through a system of wireless radio, sound and/or light-based virtual beacons communicating with the person's smartphone, tablet, computer system, or other electronic device. Wireless radio, sound and/or light-based virtual beacons (also collectively referred to as "beacons") provide a system with real-time data about the person's whereabouts, allowing for the confirmation and tracking described above and below.

The following non-limiting definitions are provided as an aid in understanding at least a preferred embodiment for the disclosed novel method and system:

| | |
|---|---|
| Electronic Location Determination & Tracking System ("System") | A specially programmed electronic system which consumes raw beacon data from the Electronic Location Determination & Tracking App on the person's electronic device and performs location determination calculations. |
| Electronic Location Determination & Tracking System Database ("Database") | An electronic database where identification and location history of persons tracked by the System are stored. |
| Electronic Location Determination & Tracking App ("App") | A specially designed software application "App" that is preloaded on, installed on, downloaded by, etc. the person or employee's electronic system or device (preferably portable or mobile electronic device) and which allows and directs the person's electronic system or device to communicate with wireless radio, sound and/or light-based virtual beacons in order to identify the person's current location. |
| Person's Electronic System or Device | A computer system or electronic device (preferable mobile and portable) including, but not limited to, a cell phone, smartphone, tablet, smart watch, laptop, card or other computer system belonging to a person that is specially programmed with the Electronic Location Determination and Tracking App to permit communication by the Person's computer system or device with one or more wireless radio, sound and/or light-based virtual beacons. |
| Wireless Radio, Sound and/or Light-based Virtual Beacon | A transmitter, preferable relatively small, capable of operating on one or more wireless radio, sound or light-based technologies between itself and electronic devices. The transmitter will preferably have directional antennas transmitting capabilities such that a particular beacon signal can be transmitted in a specific zone. Wireless radio, sound and/or light-based beacons can utilize technologies including, but not limited to, Near Field Communication (NFC), Bluetooth, Bluetooth Low Energy, WiFi, Light-Fidelity (LiFi), Ultrasound, InfraRed (IR) and Radio Frequency (RF). All of these technologies and similar current or similar later developed |

-continued

| Location Cluster | A group of wireless radio, sound and/or light-based virtual beacons which as a group are utilized in connection with some or all members of the group in the determination of a person's location. |
|---|---|
| Administrator | One or more persons preferably responsible for entering and maintaining information about each person to be tracked in the system and/or system database as well as configuring locations and other system settings. | communications technologies are included in the term "wireless radio" where the term appears in this disclosure.

DESCRIPTION OF THE DRAWINGS

Figure 1:
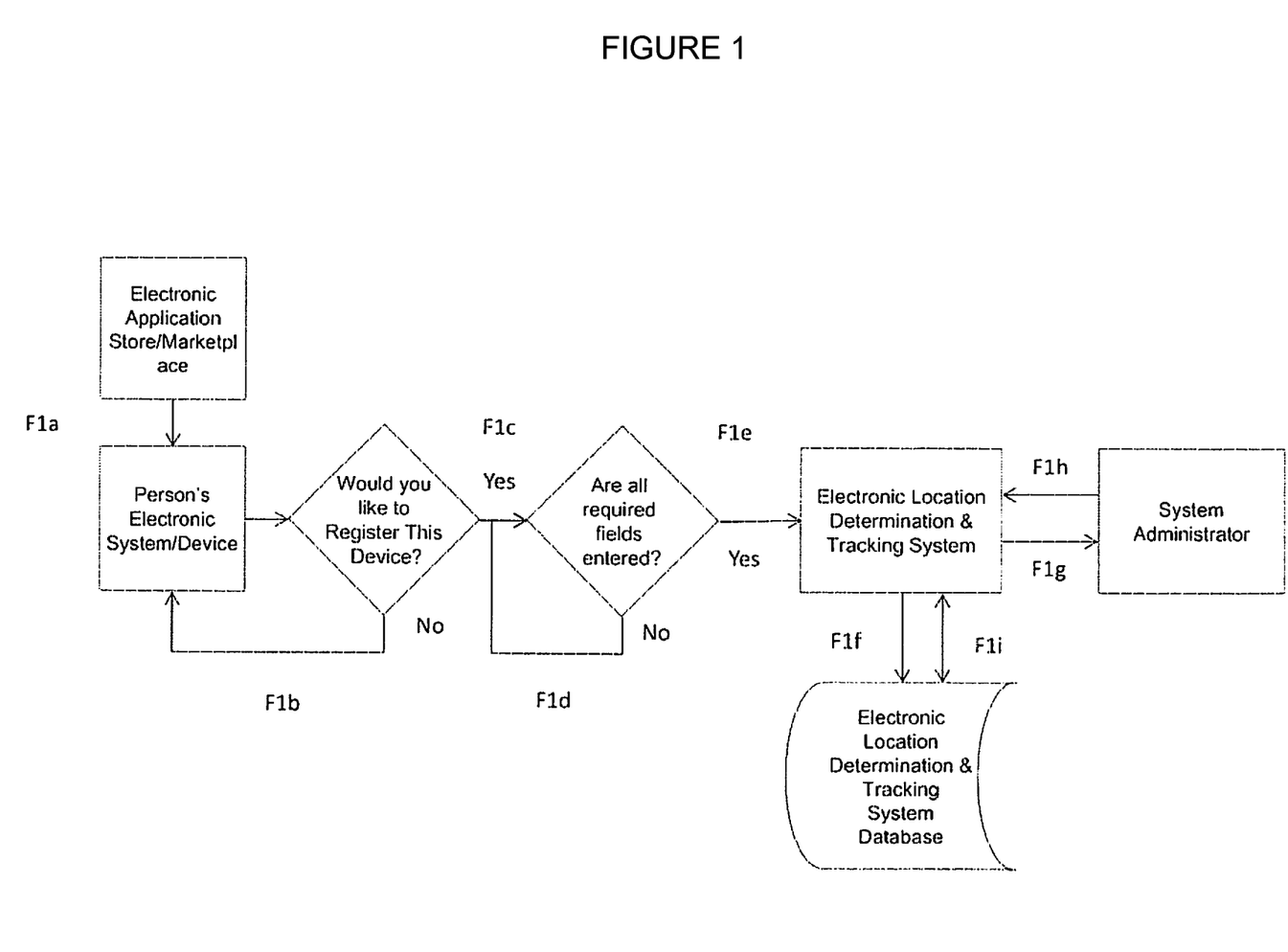
FIG. 1 is a process flow and block diagram illustrating the registration of a person's device in accordance with one embodiment for the disclosed system and method.

FIG. 1 shows one method for allowing a person to register their computer system or device with the electronic location determination and tracking system of a particular organization, company, school, venue, governmental agency, governmental building, business or area where tracking of a person's location would be beneficial. Without limitation, this initial process allows a person to be electronically and automatically tracked within the desired area.

At F1*a*, a person downloads and installs the Electronic Location Determination & Tracking Application "App" from their computer or any app store or marketplace including, but not limited to, the Apple App Store, Windows Store and Google Play marketplace. The App is downloaded to the person's electronic system or device. The App can also be preloaded on the Person's electronic device at the time the person purchases or otherwise receives the electronic device.

At F1*b*, when the App is first opened, it preferably prompts the user/person to register their electronic computer system or device with the electronic location determination & tracking system. If the user opens the App and does not wish to register the device, then the App can be programmed to operate in a non-registered mode that can limit the services available to the user/person on the device.

At F1*c*, if the person would like to register the device with the electronic location determination & tracking system, a form can appear on the screen prompting the person for information including, but not limited to, one or more of the following: their name, title, identification number, birthday, mailing address, email address, phone number, picture or other identifying information. The system and software can also be designed such that multiple electronic systems and devices are associated with one account so that a person can use a variety of different devices within one account (i.e. smartphone and tablet of a person, both associated with one account, etc.). The required fields can be selected by the administrator and can depend on the specific tracking needs of the administrator and the organization where the system is installed. The person preferably electronically submits/transmits the form when completed.

At F1*d*, if during submission by the person, the App determines that not all required fields are filled out, it can prompt the person for the missing information. The user can resubmit the form with the missing information provided or alternatively submit the missing information.

At F1*e*, once all required fields are provided and the form is submitted by the person, the data is sent to the electronic location determination & tracking system for processing.

At F1*f*, the electronic location determination & tracking system electronically stores the persons form submissions along with some identifying information for the person's device such as, but not limited to, one or more of the following: the device name, UUID, MAC address, IP Address, or other unique identifiers for the person's device. The information submitted by the person and the person's device's identifying information can all be electronically stored in the electronic location determination & tracking database.

At F1*g*, an electronic notification can be sent to the system administrator(s) via email, sms, mms, voice, fax or other electronic method of the new person registration.

At F1*h*, the system administrator can access the electronic location determination & tracking system to view and edit/update the new person's profile. The system administrator can assign the person to any group or list available, create notification rules for the person or add information about the person in its profile.

At F1*i*, any system administrator's edits/updates to the person's profile can be stored in the electronic identification, location tracking, communication and notification database.

Figure 2:
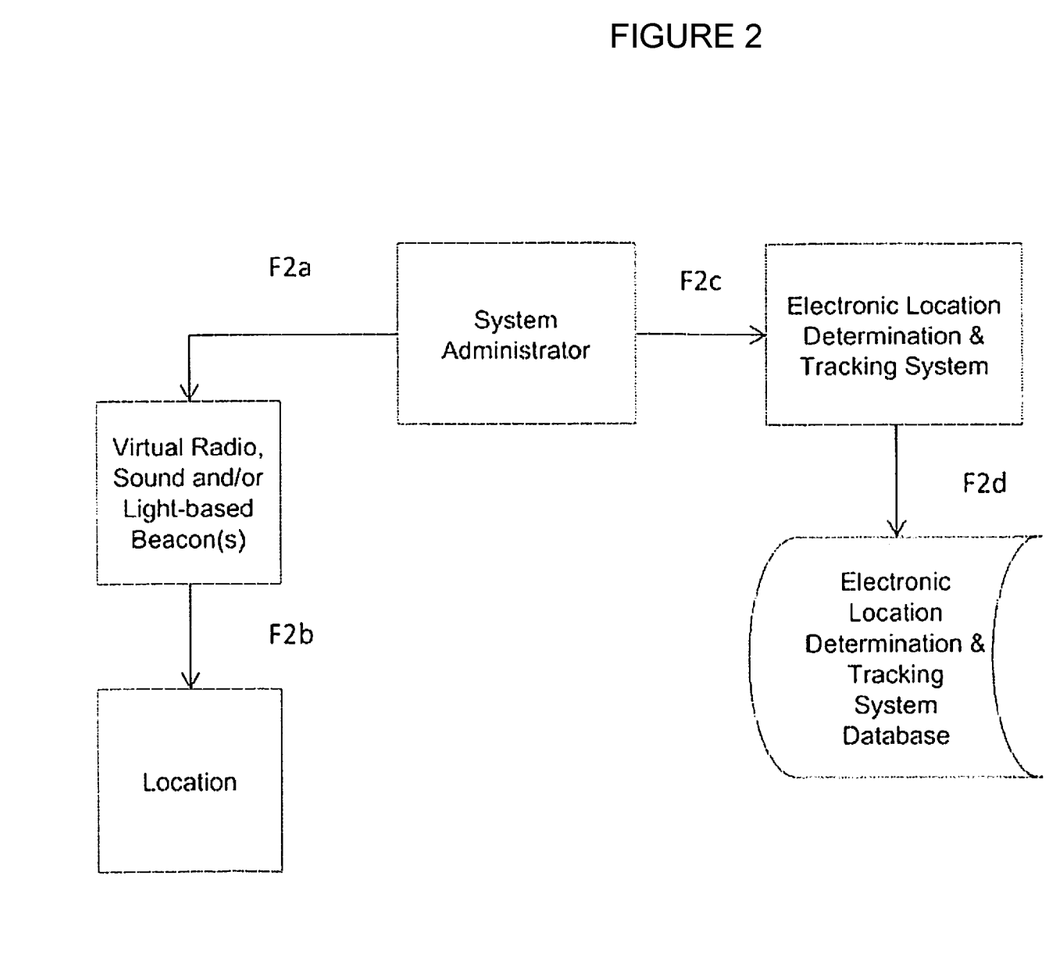
FIG. 2 is a process flow and block diagram illustrating the registration of a beacon location in accordance with one embodiment for the disclosed system and method.

FIG. 2 illustrates a preferred embodiment for how a location is registered with the electronic location determination & tracking system.

At F2*a*, a system administrator configures either a cluster of wireless radio, sound and/or light-based virtual beacons with information including, but not limited to, one or more of the following its name, unique identifier(s) (MAC Address, UUID or similar), group/organization, unique number within an organization, location, wireless networks, etc. A cluster of beacons can be preferably created when two or more beacons are grouped together to define a single location. The system administrator can select various options with regards to what the system should do when it does not receive a signal from a beacon assigned to a given location cluster. Options include, but are not limited to, discarding the particular location from a presence determination if a signal from one or more of the beacons configured for the cluster associated with the particular location is not received, assigning a default or static value for the beacon signal strength for any beacon that is assigned to the particular cluster that didn't send a signal or a signal of sufficient strength (threshold), utilizing only the top X number of beacons detected for the cluster where X is a variable number definable by the administrator, or ignoring the beacon from consideration in the presence determination. Location determination for a cluster of beacons can based on an average of the signal strength received by a device and/or system from all of the beacons assigned to a given cluster of a location and subject to the option specified above. Alternatively, the administrator can configure the system in such a manner as to take the average of the signal strength received from the top X number of beacons detected for the cluster, where X is a variable number definable by the administrator, and ignore all other beacons in a cluster from consideration or utilization in location determination. Should less than X number of beacon signals be detected, the same options as above can apply. As a non-limiting example, a cluster can contain 4 beacons but be configured in such a manner that only the 2 highest beacon signal strength values received from the cluster are averaged together for use in determining the location of the person's device.

At F2b, the configured wireless radio, sound and/or light-based virtual beacon(s) are projected on or broadcast to the configured/assigned location(s) and tested to ensure its (their) operability.

At F2c, a system administrator then preferably electronically accesses the electronic location determination & tracking system to enter in the installed wireless radio, sound and/or light-based virtual beacon(s)' configuration and location information. Alternatively, this information can be electronically received from the beacon signals and electronically downloaded by the system. Beacon clusters can be defined at this point as well. The system administrator can specify the Unique Identifiers for the beacons to be identified with a particular location. As a non-limiting example, if three beacons are configured for a location cluster, then 3 beacon identifiers must be selected to belong to this location cluster. If only a single beacon is selected then a single unique identifier is assigned to the particular location. As a non-limiting example, location can be identified by using matching identifiers on the beacons with only a single differentiator. In one embodiment, 3 identifying fields can be used for each beacon, UUID, Major Value and Minor Value. Each beacon can have values assigned to each of those 3 fields. As a non-limiting example, a 3 beacon cluster could have each beacon with a UUID of 121324-34235-342345-34423 and a major id value of 12345. Then beacon 1 in the cluster can have a minor value of 1, beacon 2 can have a minor value of 2 and beacon 3 can have a minor value of 3 (or some other differing numbering, lettering, characters or other indicia). The next cluster could have 3 beacons with the same UUID as above but with a different major value. Additional configuration of the beacon(s) and location(s) can also be performed at this step, which can include, but is not limited to, configuring notification settings, signal types, signal strengths, transmission power and device presence durations.

At F2d. the wireless radio, sound and/or light-based virtual beacon's configuration and location information can be stored in the electronic location determination & tracking database.

Figure 3:
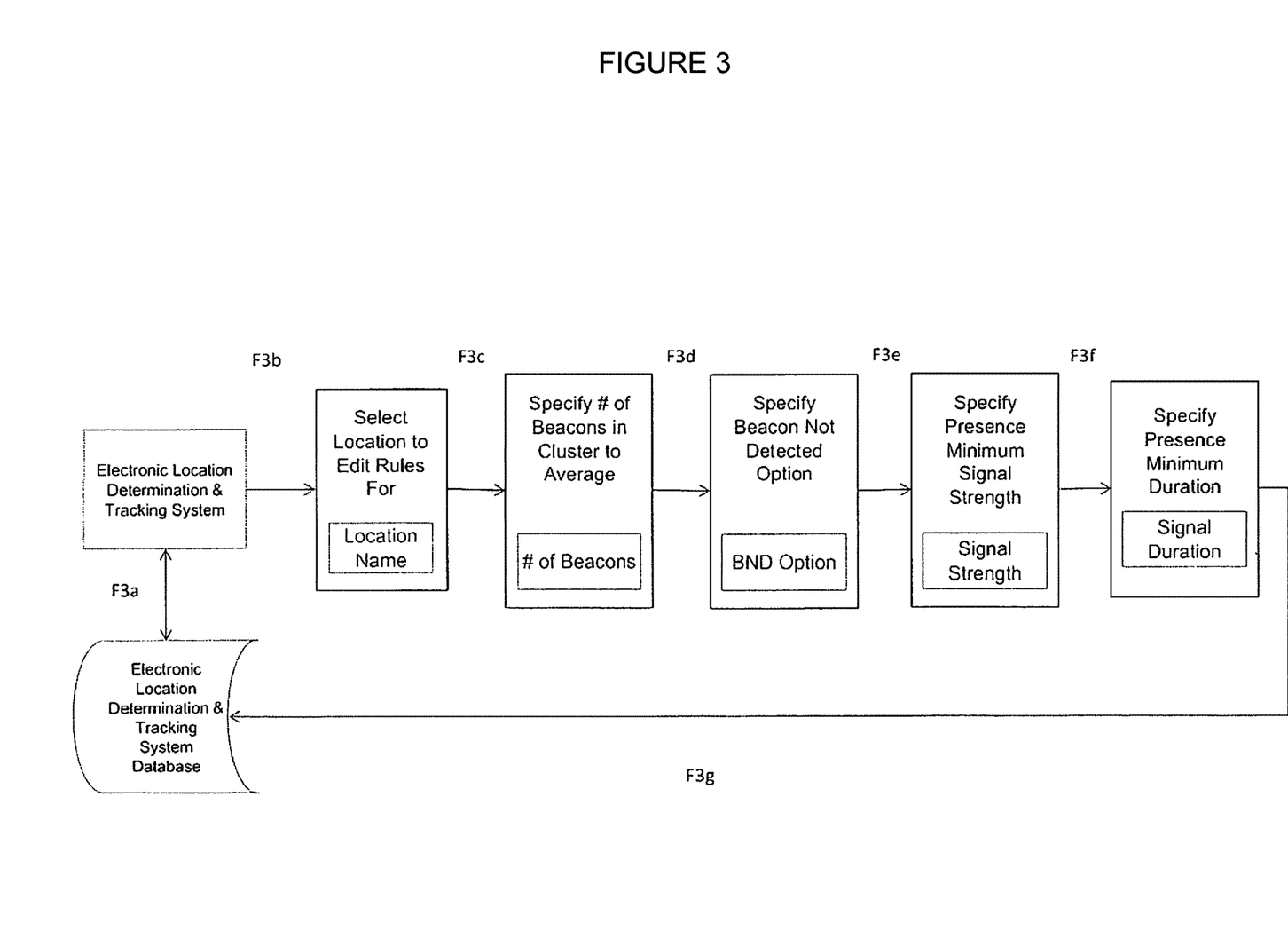
FIG. 3 is a process flow and block diagram illustrating a person's presence at a location determination rules engine in accordance with one embodiment for the disclosed system and method.

FIG. 3 demonstrates how a person's presence at a location is determined and configured within the Electronic Location Determination & Tracking System in one non-limiting embodiment. This process can also be utilized to edit presence determination configurations already stored in the database.

At F3a, the Electronic Location Determination & Tracking System queries the Electronic Location Determination & Tracking Database for a list of available locations. Available locations can be ones that are entered into the system database as described in FIG. 2. Configuring refers to setting parameters for a location to assign a beacon cluster to a location as well as to aid in the determination of presence at that location based on number of beacons in the cluster, signal strength and duration. This function can be typically reserved for a system administrator, though such is not considered limiting.

At F3b, the Electronic Location Determination & Tracking System displays a listing of available locations to configure. The system administrator or other authorized individual can then select the location to configure or edit the configuration of Reconfiguring the location can be for a variety of reasons, such as, but not limited to, adding additional beacons to a location cluster for better accuracy, replace a beacon that is faulty, or changing the presence determination criteria to make the system more or less sensitive/accurate.

At F3c, once the location is selected, the system administrator may now specify the minimum number of beacons used for presence determination calculation in this location. When a cluster of beacons is configured for a location, the system preferably uses the average of the received signal strengths (by the person's electronic device) for all beacons in a cluster in determining location or presence at a location. As a non-limiting example, if a location is configured for a cluster of 3 beacons, the signal strength received from each of the beacons is averaged to create a single location signal strength value. However, in certain instances, a person's electronic device may not receive signals from all beacons in a cluster. In these instances, the administrator can configure the exact number of beacons in a cluster to consider for location determination, though it is not required to be configured in this manner. When configured in such a manner, the system will calculate the average of the highest X number of received signal strengths from the beacons in that cluster, where X is the number defined by the administrator, and ignore all other beacons in a cluster from consideration or utilization in location determination. Should less than X number of beacon signals be detected or this option not configured, the administrator can configure additional options in F3d below. As a non-limiting example, a cluster can contain 4 beacons but be configured in such a manner that only the 2 highest beacon signal strength values received from the cluster are averaged together for use in determining the location of the person's device.

Next, at F3d, the system administrator may now select what the system should do when it does not receive a signal from a beacon assigned to a given location cluster. Options include, but are not limited to, discarding this location from the presence determination if a signal from all beacons configured for the cluster is not received, assigning a default or static value for the beacon signal strength for any beacon that is assigned to the particular cluster but didn't receive a signal, or ignoring the beacon from consideration in the presence determination.

Next, at F3e, the system administrator may specify the minimum signal strength threshold for a person to be considered present at this particular location. This signal strength is the measure of the strength of a known wireless radio, sound and/or light-based virtual beacon(s) transmitted signal strength as received by the person's electronic system or device. As a non-limiting example, the signal strength can be measured and calculated on a scale of 0 to 100% where the minimum signal strength threshold is set to 80%. This means that unless the person's device receives a signal from the wireless radio, sound and/or light-based virtual beacon(s) greater than the 80% strength threshold, they will not be considered present at a location. Though it is preferred that the beacons are of the same type for a particular cluster, it is within the scope of the disclosure to have a location cluster made up beacons of differing types (i.e. Bluetooth virtual beacon, a light-based virtual beacon and a sound based virtual beacon). The signal strength measurement is intended to approximate the distance between the person's electronic system or device and the wireless radio, sound and/or light-based virtual beacons and can also include strength indicators including but not limited to RSSI (relative signal strength indicator) values. As mentioned above, RSSI is a signal strength indicator based on an industry standard algorithm that factors into account the known signal transmission power level.

At F3f, once the minimum presence signal strength threshold has been entered, the system administrator has the option of specifying the minimum presence duration for that location. The minimum presence duration is a time value and can be expressed in any known and acceptable time format including but not limited to milliseconds, seconds, minutes and hours. As a non-limiting example, the system administrator can configure the value to 20 seconds. In this instance the person's electronic system or device must report to the Electronic Location Determination & Tracking system a signal strength above the minimum threshold specified in F3e for a period of at least 20 consecutive seconds in order to consider the person's electronic system or device present at that location.

At F3g, the location's presence determination configuration profile is updated in the Electronic Location Determination & Tracking Database.

Figure 4:
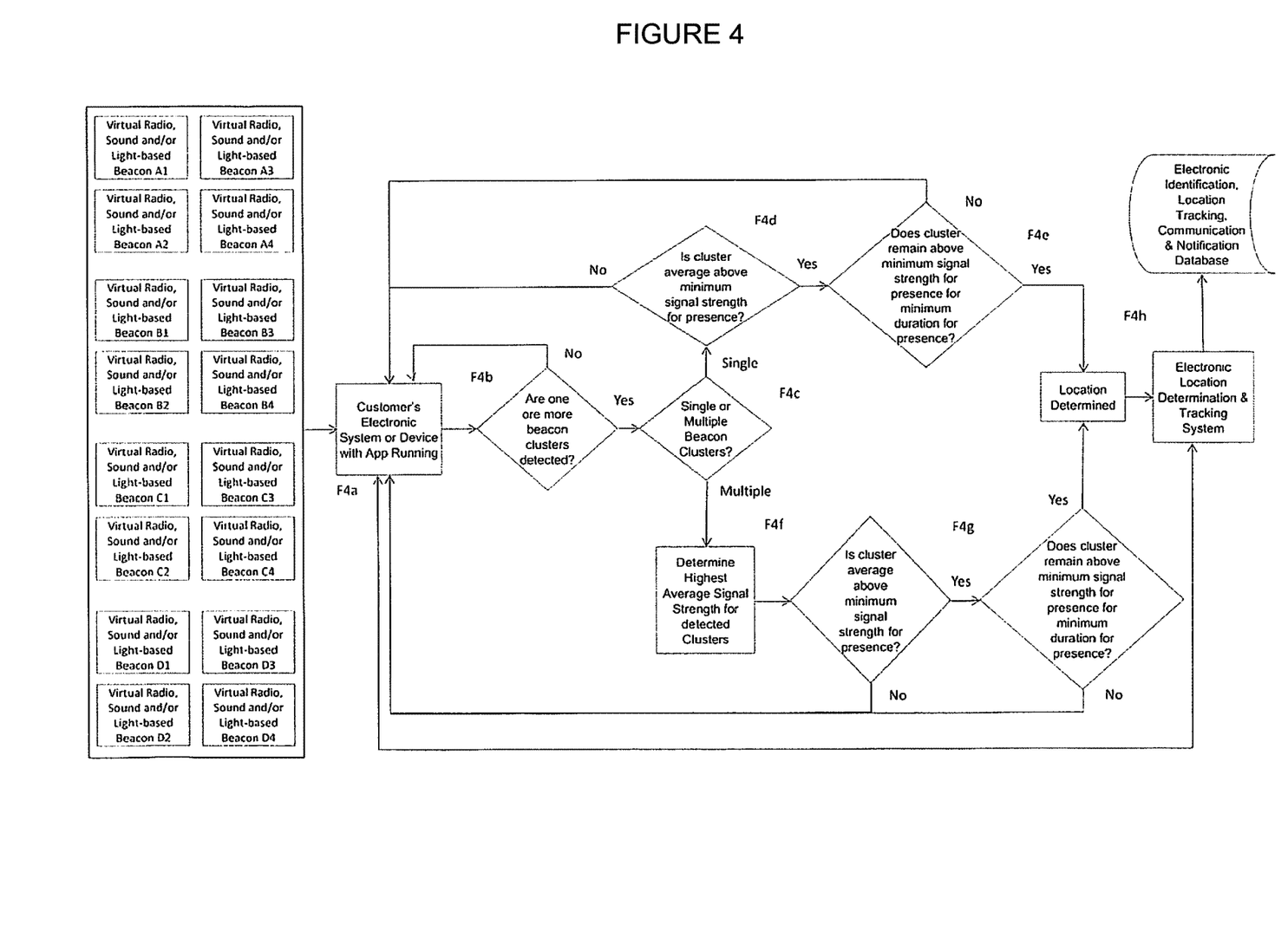
FIG. 4 is a process flow and block diagram illustrating a first embodiment for determining a person's presence at location by the disclosed system and method.

FIG. 4 illustrates the first non-limiting embodiment of how the system determines the location of person based on their registered device and detected beacon signals. The process below continually repeats and it is within the scope of this disclosure for numerous parallel processes to be occurring using successive data sets from each new detection of one or more virtual beacon signals.

At F4a, the person's electronic system or device with the Electronic Location Determination & Tracking Application "App" downloaded/installed and running is preferably constantly and automatically scanning for wireless radio, sound and/or light-based virtual beacon signals. The App at periodic intervals will download a database of current location and location settings from the Electronic Location Determination & Tracking system to ensure it is in synchronization with the System database.

At F4b, the App takes all received virtual beacon signals and analyzes them for beacon identifiers, signal type and signal strengths. The App checks whether a cluster of beacons is detected among the received signals based on the options configured in FIG. 3 including, but not limited to, the number of beacons required for the cluster and options for when not all beacons in a cluster are not detected. If no clusters are detected, the App continues to analyze the subsequent sets of received beacon signals. If one or more clusters are detected, the process proceeds to F4c.

At F4c, the App determines whether a single beacon cluster or multiple beacon clusters are detected. If a single beacon cluster is detected, the process continues at F4d. If multiple beacon clusters are detected, the process will continue at F4f below.

At F4d, the App determines whether the average signal strength of the cluster is above the minimum signal strength for presence configured for that location cluster. The average signal strength can be calculated according to the options configured for the location associated with virtual beacon cluster as described and configured in FIG. 3. If the average received signal strength of the cluster is below the minimum value, the process preferably begins again at step F4a with the next set of beacon signals received. If the average received signal strength for the cluster is above the minimum signal strength for presence configured for the location cluster, the process continues to F4e below. As a non-limiting example, the signal strength, which in this instance can be measured and calculated on a scale of 0 to 100% can be configured to a minimum threshold of 80%. This means that unless the person's device receives a signal from the wireless radio, sound and/or light-based virtual beacons greater than the 80% strength threshold, they cannot be considered present at a location.

At F4e, the App determines whether signal strength for the virtual beacon cluster remains above the minimum signal strength for presence for longer than the configured duration for that location. If the cluster has not remained above the minimum signal strength for presence for longer than the configured minimum duration for presence, the App keeps a record of the beacon cluster and utilize this to age the next set of virtual beacon signals it receives for this cluster. If the App determines that the signal strength has remained above the minimum signal strength for presence for longer than the minimum duration for presence, the App makes the determination of the person's mobile device at the location assigned to the virtual beacon cluster. Continuing from the non-limiting example in F4d above, if this minimum duration threshold is set to 20 seconds, the App must continue to report a signal strength value above the 80% value for a duration of 20 consecutive seconds in order to consider the person's electronic system or device present at that location. The process continues at F4h. If the minimum time duration is not reached, the process preferably begins again at step F4a with the next set of beacon signals received.

At F4f, the App compares the average received signal strengths for all virtual beacon clusters and determines which cluster has the highest average signal strength. The App then determines whether the average signal strength for the cluster is above the minimum signal strength for presence for the location associated with the cluster. If the average signal strength is below the minimum, the process preferably repeats at F4a. If the average received signal strength for the cluster is above the minimum signal strength for presence configured for the location cluster, the process continues to F4g below. As a non-limiting example, the signal strength, which in this instance can be measured and calculated on a scale of 0 to 100% can be configured to a minimum threshold of 80%. This means that unless the person's device receives a signal from the wireless radio, sound and/or light-based virtual beacons greater than the 80% strength threshold, they cannot be considered present at a location.

At F4g, the App determines whether signal strength for the virtual beacon cluster remains above the minimum signal strength for presence for longer than the configured duration for that location. If the cluster has not remained above the minimum signal strength for presence for longer than the configured minimum duration for presence, the App keeps a record of the beacon cluster and utilize this to age the next set of virtual beacon signals it receives for this cluster. If the App determines that the signal strength has remained above the minimum signal strength for presence for longer than the minimum duration for presence, the App makes the determination of the person's mobile device at the location assigned to the virtual beacon cluster. Continuing from the non-limiting example in F4f above, if this minimum duration threshold is set to 20 seconds, the App must continue to report a signal strength value above the 80% value for a duration of 20 consecutive seconds in order to consider the person's electronic system or device present at that location. If the minimum time duration is not reached for any cluster of the multiple beacon cluster, the process preferably begins again at step F4a with the next set of beacon signals received.

At F4h, the App sends its determined location for the device it is installed on to the Electronic Location Determination & Tracking System. The Electronic Location Determination & Tracking System stores the person's device location in the Electronic Location Determination & Tracking System Database which it is in wired or wireless electronic communication with.

Figure 5:
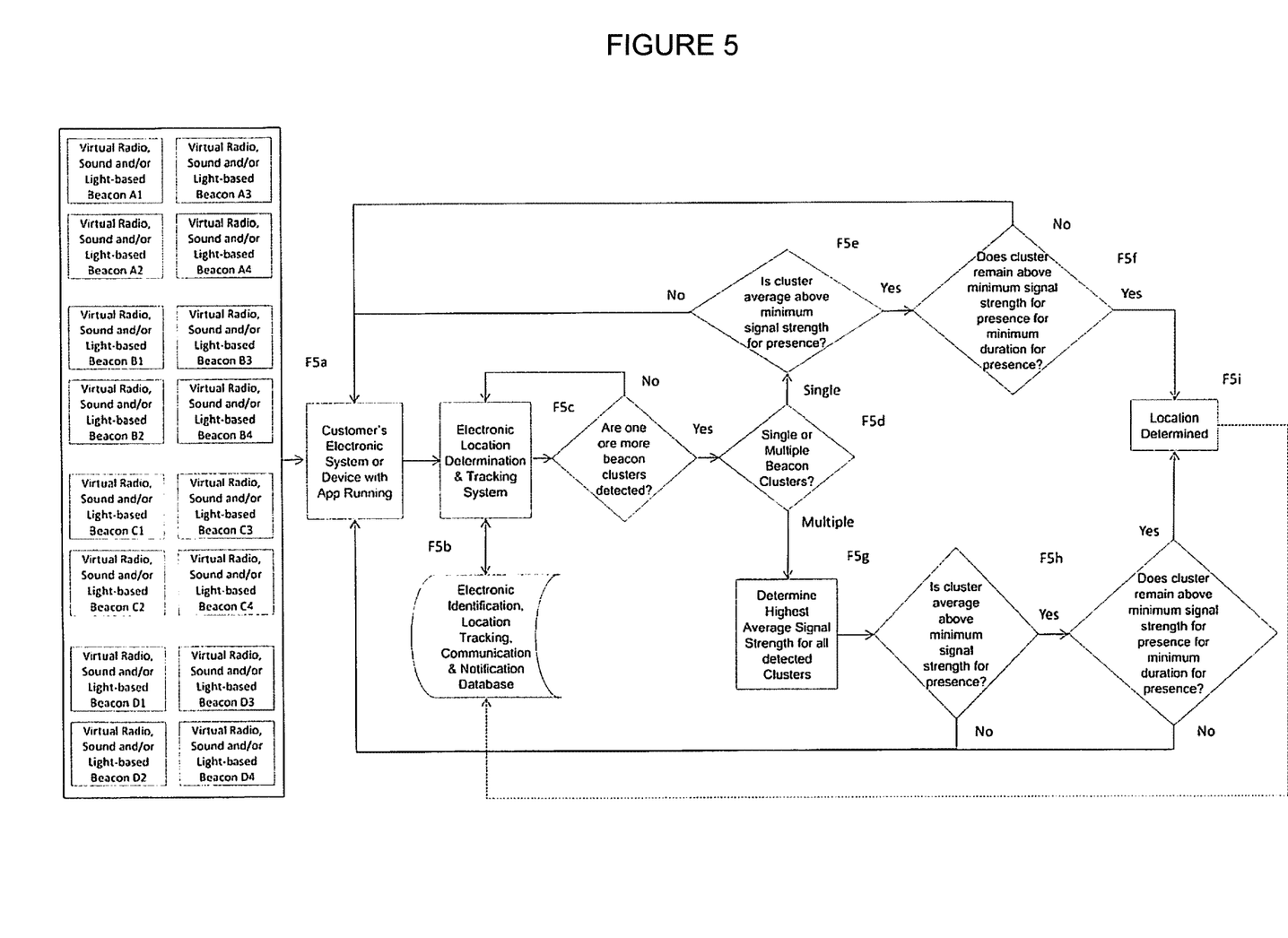
FIG. 5 is a process flow and block diagram illustrating a second embodiment for determining a person's presence at location by the disclosed system and method.

FIG. 5 illustrates another non-limiting embodiment of how the system determines the location of person based on their registered device and detected beacon signals. The process below continually repeats and it is within the scope of this disclosure for numerous parallel processes to be occurring using successive data sets from each new detection of one or more virtual beacon signals.

At F5a, the person's electronic system or device with the Electronic Location Determination & Tracking Application "App" downloaded/installed and running is preferably constantly and automatically scanning for wireless radio, sound and/or light-based virtual beacon signals.

At F5b, the App transmits all received virtual beacon signals to the Electronic Location Determination & Tracking System "System" where the System takes all received virtual beacon signals and analyzes them for beacon identifiers, signal type and signal strengths.

At F5c, the System checks whether a cluster of beacons is detected among the received signals based on the options configured in FIG. 3 including, but not limited to, the number of beacons required for the cluster and options for when not all beacons in a cluster are not detected. If no clusters are detected, the System continues to analyze the subsequent sets of received beacon signals. If one or more clusters are detected, the process proceeds to F5d.

At F5d, the System determines whether a single beacon cluster or multiple beacon clusters are detected. If a single beacon cluster is detected, the process continues at F5e. If multiple beacon clusters are detected, the process will continue at F5g below.

At F5e, the System determines whether the average signal strength of the cluster is above the minimum signal strength for presence configured for that location cluster. The average signal strength can be calculated according to the options configured for the location associated with virtual beacon cluster as described and configured in FIG. 3. If the average received signal strength of the cluster is below the minimum value, the process begins again at step F5b with the next set of beacon signals received. If the average received signal strength for the cluster is above the minimum signal strength for presence configured for the location cluster, the process continues to F5f below. As a non-limiting example, the signal strength, which in this instance can be measured and calculated on a scale of 0 to 100% can be configured to a minimum threshold of 80%. This means that unless the person's device receives a signal from the wireless radio, sound and/or light-based virtual beacons greater than the 80% strength threshold, they cannot be considered present at a location.

At F5f, the System determines whether signal strength for the virtual beacon cluster remains above the minimum signal strength for presence for longer than the configured duration for that location. If the cluster has not remained above the minimum signal strength for presence for longer than the configured minimum duration for presence, the System keeps a record of the beacon cluster and utilize this to age the next set of virtual beacon signals it receives for this cluster. If the System determines that the signal strength has remained above the minimum signal strength for presence for longer than the minimum duration for presence, the System makes the determination of the person's mobile device at the location assigned to the virtual beacon cluster. Continuing from the non-limiting example in F5e above, if this minimum duration threshold is set to 20 seconds, the System must continue to report a signal strength value above the 80% value for a duration of 20 consecutive seconds in order to consider the person's electronic system or device present at that location. The process continues at F5i. If the minimum time duration is not reached, the process preferably begins again at step F5b with the next set of beacon signals received.

At F5g, the System compares the average received signal strengths for all virtual beacon clusters and determines which cluster has the highest average signal strength. The System then determines whether the average signal strength for the cluster is above the minimum signal strength for presence for the location associated with the cluster. If the average signal strength is below the minimum, the process repeats at F5b. If the average received signal strength for the cluster is above the minimum signal strength for presence configured for the location cluster, the process continues to F5h below. As a non-limiting example, the signal strength, which in this instance can be measured and calculated on a scale of 0 to 100% can be configured to a minimum threshold of 80%. This means that unless the person's device receives a signal from the wireless radio, sound and/or light-based virtual beacons greater than the 80% strength threshold, they cannot be considered present at a location.

At F5h, the System determines whether signal strength for the virtual beacon cluster remains above the minimum signal strength for presence for longer than the configured duration for that location. If the cluster has not remained above the minimum signal strength for presence for longer than the configured minimum duration for presence, the System keeps a record of the beacon cluster and utilize this to age the next set of virtual beacon signals it receives for this cluster. If the System determines that the signal strength has remained above the minimum signal strength for presence for longer than the minimum duration for presence, the System makes the determination of the person's mobile device at the location assigned to the virtual beacon cluster. Continuing from the non-limiting example in F5g above, if this minimum duration threshold is set to 20 seconds, the System must continue to report a signal strength value above the 80% value for a duration of 20 consecutive seconds in order to consider the person's electronic system or device present at that location. If the minimum time duration is not reached for any cluster of the multiple beacon clusters, the process preferably begins again at step F4a with the next set of beacon signals received.

At F5i, the System stores its determined location for the device in the Electronic Location Determination & Tracking System Database.

Figure 6:
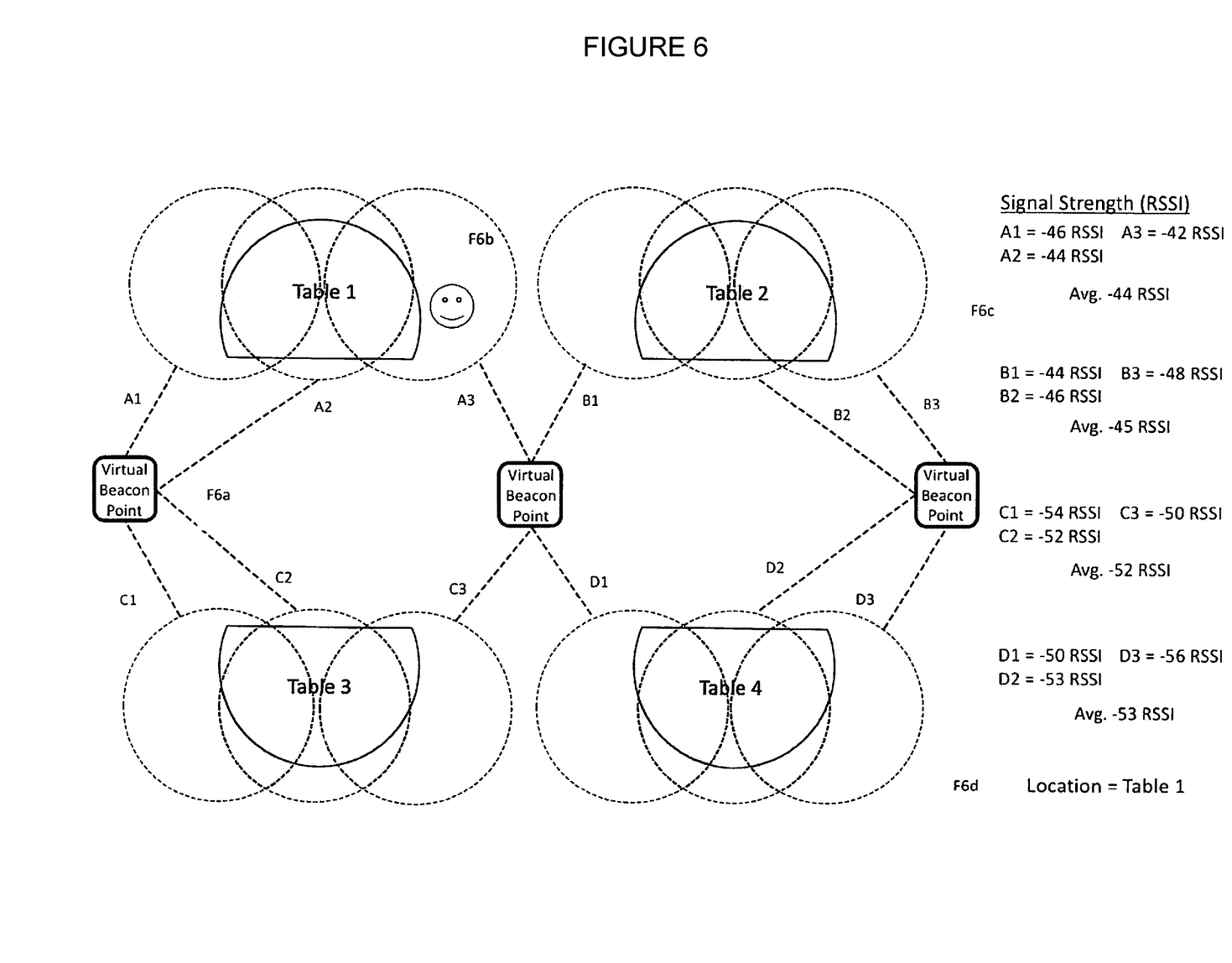
FIG. 6 illustrates a sample of a person presence determination using beacon clustering at a location in accordance with one embodiment for the disclosed system and method.

FIG. 6 demonstrates one non-limiting embodiment of how a cluster of virtual beacons can be assigned to a location and used for location determination within the Electronic Location Determination & Tracking System and/or Electronic Location Determination & Tracking App.

At F6a, in the non-limiting example virtual beacons are configured for four locations, Table 1, Table 2, Table 3 and Table 4. Each table can have 3 virtual beacons configured in the cluster. It should be recognized that a table is just one of many non-limiting examples of where the virtual beacons can be located or associated with. Other non-limiting examples of virtual beacon locations are rooms, booths, halls, doorways and even specific areas within a room.

At F6b, a person with the Electronic Location Determination & Tracking App on the persons' electronic system or device sits down at Table 1 as illustrated or otherwise positions him or herself at Table 1.

At F6c, the Electronic Location Determination & Tracking Application "App" on the persons' electronic system or device receives beacon signals from all nearby virtual beacons and preferably utilizing either of the methods described in FIG. 4 or FIG. 5, calculates the average signal strength for each virtual beacon signal received by the person's electronic system or device running the App. As a non-limiting example, the signal strength measurements for each virtual beacon is displayed in the chart on the figure. The Electronic Location Determination & Tracking Application or System can calculate a signal average for each location based on all of the beacon signal strengths received.

At F6d, the Electronic Location Determination & Tracking Application or System makes a determination on presence at the location of Table 1 based on a higher average signal strength received from the virtual beacons in the Table 1 location cluster then the average signal strength received from the virtual beacons in the other location clusters. Preferably, the App and/or System continuously monitors for the person's location. However, it is within the scope of the disclosure to provide for a configurable setting for how frequently the system checks for virtual beacons, which can be, without limitation, anywhere from about every fraction of a second to any time limit the administrator specifies. Periodic checking, as opposed to continuous monitoring, would provide for lower battery usage on the phone/electronic device.

Figure 7:
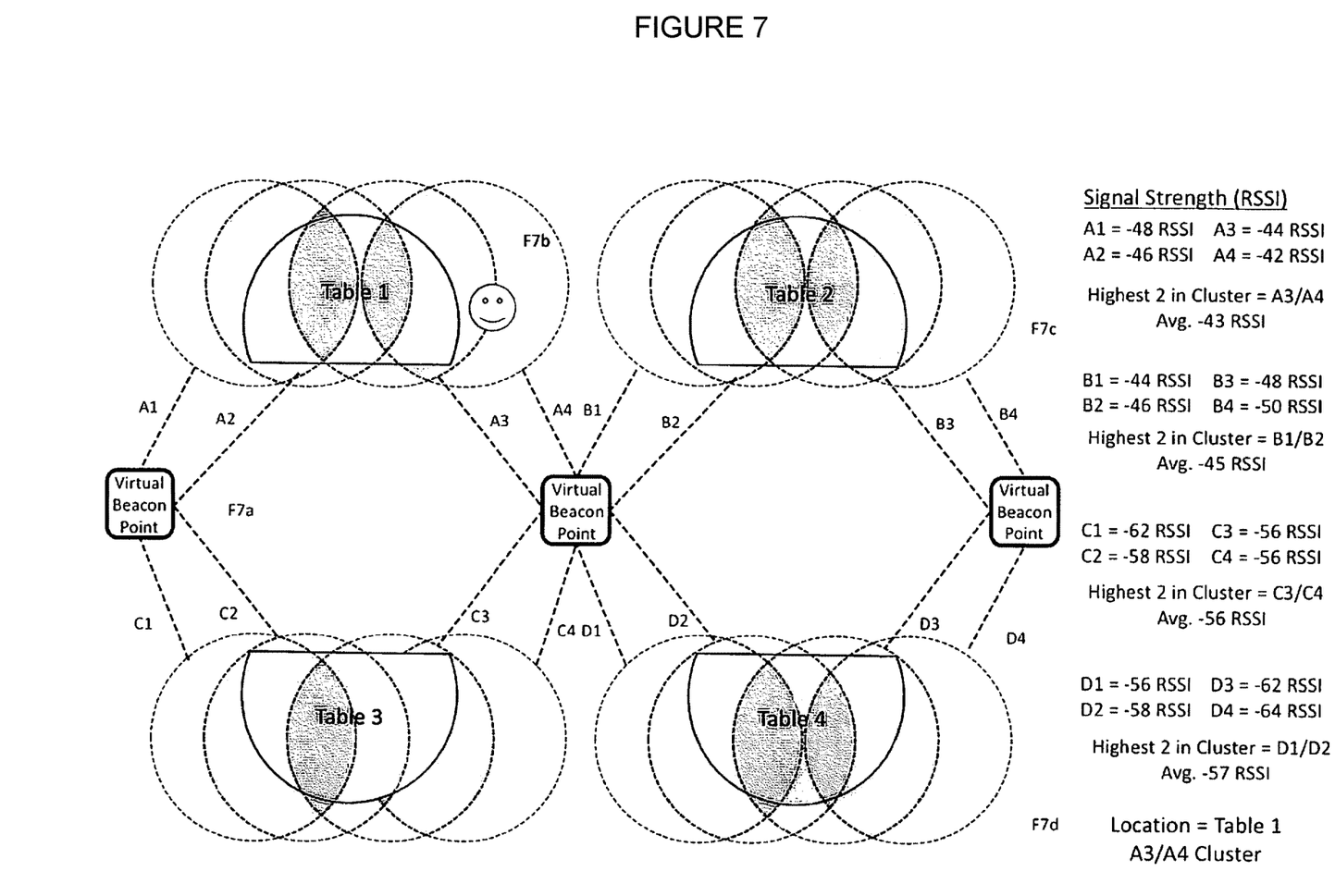
FIG. 7 illustrates a sample of a person presence determination using beacon clustering at a location in accordance with another embodiment for the disclosed system and method.

FIG. 7 demonstrates one non-limiting embodiment of how a cluster of virtual beacons can be assigned to a location and used for location determination within the Electronic Location Determination & Tracking System and/or Electronic Location Determination & Tracking App.

At F7a, virtual beacons are configured for four locations, Table 1, Table 2, Table 3 and Table 4. Each table can have 4 virtual beacons configured in the cluster and the option to utilize only the highest 2 virtual beacon signals received by the App in calculating the average received virtual beacon signal strength for a given virtual beacon cluster. It should be recognized that a table is just one of many non-limiting examples of where the virtual beacons are located or associated with. Other non-limiting examples of virtual beacon locations are rooms, booths, halls, doorways and even specific areas within a room.

At F7b, a person with the Electronic Location Determination & Tracking App on the persons' electronic system or device sits down at Table 1 as illustrated or otherwise positions him or herself at Table 1.

At F7c, the Electronic Location Determination & Tracking Application "App" on the persons' electronic system or device receives beacon signals from all nearby virtual beacons and transmits the virtual beacon data to the System for analysis or performs the analysis on the person's electronic system or device preferably as described in FIG. 4 or FIG. 5. As a non-limiting example, the highest 2 virtual beacon signals for a cluster are averaged to determine an average received signal strength while the remainder of the virtual beacon signals received for a given cluster can be preferably ignored. The signal strength measurements for each virtual beacon is displayed in the chart on the figure. The Electronic Location Determination & Tracking Application or System can preferably calculate a signal average for each location based on the 2 highest virtual beacon signal strengths received for a cluster.

At F7d, the Electronic Location Determination & Tracking Application or System makes a determination on presence at the location of Table 1 based on a higher average signal strength received from the highest 2 virtual beacons in the Table 1 location cluster then the average signal strength received from the highest 2 virtual beacons in the other location clusters. Preferably, the App and/or System continuously monitors for the person's location. However, it is within the scope of the disclosure to provide for a configurable setting for how frequently the system checks for virtual beacons, which can be, without limitation, anywhere from about every fraction of a second to any time limit the administrator specifies. Periodic checking, as opposed to continuous monitoring, would provide for lower battery usage on the phone/electronic device.

Each disclosed virtual beacon can provide for a single device that can broadcast multiple virtual beacons preferably at some distance and angle away from itself. Each virtual beacon can send out multiple directional (zonal) beacon signals that can each be independently configured as beacons and thus can be grouped into clusters. The users phone app/electronic device can pick up the virtual beacons and the system can work similar to how it can work with physical beacons and the clustering/averaging of signal strengths The application and system that performs the above described functions and steps can include several components including, but not necessarily limited to, the following:
1. One or more Wireless Radio, Sound and/or Light-based Virtual Beacon(s)
2. One or more person's electronic computer system or device(s)
3. Electronic Location Determination & Tracking System
4. Electronic Location Determination & Tracking Database
5. Electronic Location Determination & Tracking Application
6. A public or private computer network to connect or communicate the person's device with Electronic Location Determination & Tracking Application running, virtual beacons and Electronic Location Determination & Tracking system and database with each other. The various components can be in electrical and wireless communication with each other.

As one non-limiting example, the ability to electronically determine a person's location and track that person's movements will provide significant administrative and financial benefits incident to operators of healthcare, education, hospitality or other venues. Without limitation, these include the following benefits:

1. Provide venue administrators the ability to identify a person and the person's precise location within their facility.
2. Provide persons with real-time mapping and navigation in buildings and other configured venues.
3. Analyze person levels and behavior so as to tailor or modify service offerings and maximize profitability.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the disclosure has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for determining a presence of a person at a particular area within a location by an electronic location identification and tracking system application ("App"), said method comprising the steps of:
   a. configuring a plurality of virtual beacon clusters at different points within a location, each beacon cluster of the plurality of virtual beacon clusters comprising a plurality of virtual beacons that are only associated with the beacon cluster and not with any other beacon cluster of the plurality of virtual beacon clusters;
   b. arriving at a particular area within the location by a person possessing an electronic system or device, the electronic system or device running an electronic location identification and tracking system application ("App");
   c. receiving beacon signals from nearby virtual beacons by the App; and
   d. determining a current area within the location that the person is located at by the App or an electronic identification and location tracking system ("System") in electronic communication with the App based on the received beacon signals;
   wherein if signals were received from multiple beacon clusters of the plurality of beacon clusters step d. comprises determining which beacon cluster of the multiple beacon clusters had a highest average signal strength by the App or System and selecting an area associated with the determined beacon cluster as the current area that the person is located at.

2. The method for determining of claim 1 wherein step d. comprises determining which beacon cluster of the plurality of virtual beacon clusters had a highest average signal strength by the App or System and selecting an area associated with the determined beacon cluster as the current area that the person is located at.

3. The method for determining of claim 2 wherein step d. further comprises calculating an average signal strength for each beacon cluster of the plurality of beacon clusters that the App received beacon signals from in step c.

4. The method for determining of claim 2 wherein step d. further comprises calculating an average signal strength for each beacon cluster that signals were received from in step c. using only a first and second highest beacon signal strength value for each beacon cluster.

5. The method for determining of claim 1 wherein if signals were only received from a single beacon cluster of the plurality of beacon clusters step d. comprises selecting an area associated with the single beacon cluster as the current area that the person is located at.

6. A method for determining a presence of a person at a particular area within a location by an electronic location identification and tracking system application ("App"), said method comprising the steps of:
   a. configuring a plurality of virtual beacon clusters at different points within a location, each beacon cluster of the plurality of virtual beacon clusters comprising a plurality of virtual beacons that are only associated with the beacon cluster and not with any other beacon cluster of the plurality of virtual beacon clusters;
   b. arriving at a particular area within the location by a person possessing an electronic system or device, the electronic system or device running an electronic location identification and tracking system application ("App");
   c. receiving beacon signals from nearby virtual beacons by the App;
   d. determining which beacon cluster of the plurality of virtual beacon clusters had a highest average signal strength by the App or an electronic identification and location tracking system ("System) in electronic communication with the App; and e. selecting an area associated with the determined beacon cluster as the current area that the person is located at;

wherein if signals were received from multiple beacon clusters of the plurality of beacon clusters step d. comprises determining which beacon cluster of the multiple beacon clusters had a highest average signal strength by the App or System and selecting an area associated with the determined beacon cluster as the current area that the person is located at.

7. The method for determining of claim 6 wherein step d. further comprises calculating an average signal strength for each beacon cluster of the plurality of beacon clusters that the App received beacon signals from in step c.

8. The method for determining of claim 6 further comprising the step of determining whether beacon signals were received by the App in step c. from beacons associated only with a single beacon cluster of the plurality of beacon clusters or from multiple beacon clusters of the plurality of beacon clusters prior to step d.

9. The method for determining of claim 8 wherein if signals were only received from a single beacon cluster of the plurality of beacon clusters step d. comprises selecting an area associated with the single beacon cluster as the current area that the person is located at.

10. The method for determining of claim 6 wherein step d. further comprises calculating an average signal strength for each beacon cluster that signals were received from in step c. using only a first and second highest beacon signal strength value for each beacon cluster.

11. A method for determining a presence of a person at a particular area within a location by an electronic location identification and tracking system application ("App"), said method comprising the steps of:

a. configuring a plurality of virtual beacon clusters at different points within a location, each beacon cluster of the plurality of virtual beacon clusters comprising a plurality of virtual beacons that are only associated with the beacon cluster and not with any other beacon cluster of the plurality of virtual beacon clusters;

b. arriving at a particular area within the location by a person possessing an electronic system or device, the electronic system or device running an electronic location identification and tracking system application ("App");

c. receiving beacon signals from nearby virtual beacons by the App;

d. calculating an average signal strength for each beacon cluster that signals were received from in step c.; and e. determining a current area within the location that the person is located at by the App or an electronic identification and location tracking system ("System") in electronic communication with the App based on the received beacon signals;

wherein if signals were received from multiple beacon clusters of the plurality of beacon clusters step e. comprises determining which beacon cluster of the multiple beacon clusters had a highest average signal strength by the App or System and selecting an area associated with the determined beacon cluster as the current area that the person is located at.

12. The method for determining of claim 11 wherein step e. comprises determining which beacon cluster of the plurality of virtual beacon clusters had a highest average signal strength by the App or System and selecting an area associated with the determined beacon cluster as the current area that the person is located at.

13. The method for determining of claim 11 further comprising the step of determining whether beacon signals were received by the App in step c. from beacons associated with a single beacon cluster of the plurality of beacon clusters or from multiple beacon clusters of the plurality of beacon clusters prior to step e.

14. The method for determining of claim 13 wherein if signals were only received from a single beacon cluster of the plurality of beacon clusters step e. comprises selecting an area associated with the single beacon cluster as the current area that the person is located at.

15. The method for determining of claim 13 wherein if signals were received from multiple beacon clusters of the plurality of beacon clusters step e. comprises determining which beacon cluster of the multiple beacon clusters had a highest average signal strength by the App or System and selecting an area associated with the determined beacon cluster as the current area that the person is located at.

16. The method for determining of claim 11 wherein step d. comprises calculating an average signal strength for each beacon cluster that signals were received from in step c. using only a first and second highest beacon signal strength value for each beacon cluster.

* * * * *